United States Patent
Boettcher et al.

(10) Patent No.: US 10,434,717 B2
(45) Date of Patent: Oct. 8, 2019

(54) FABRICATING THREE-DIMENSIONAL OBJECTS WITH OVERHANG

(71) Applicant: Microsoft Technology Licensing, LLC, Redmond, WA (US)

(72) Inventors: Shanen J. Boettcher, Bellevue, WA (US); Yulin Jin, Redmond, WA (US); Emmett Lalish, Seattle, WA (US); Jesse McGatha, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 207 days.

(21) Appl. No.: 15/628,424

(22) Filed: Jun. 20, 2017

(65) Prior Publication Data

US 2017/0348915 A1 Dec. 7, 2017

Related U.S. Application Data

(63) Continuation of application No. 14/195,174, filed on Mar. 3, 2014, now abandoned.

(51) Int. Cl.
  *B33Y 50/00* (2015.01)
  *B29C 64/386* (2017.01)
  (Continued)

(52) U.S. Cl.
  CPC ........... *B29C 64/386* (2017.08); *B29C 64/40* (2017.08); *G06T 11/203* (2013.01); *G06T 17/10* (2013.01);
  (Continued)

(58) Field of Classification Search
  CPC . G06T 19/20; G06T 17/20; G06T 2219/2021; G06T 19/00; G06T 7/12;
  (Continued)

(56) References Cited

U.S. PATENT DOCUMENTS

| | | | |
|---|---|---|---|
| 5,663,883 A | | 9/1997 | Thomas et al. |
| 6,246,805 B1 * | | 6/2001 | Sanjeev .................. G09G 5/28 345/468 |

(Continued)

FOREIGN PATENT DOCUMENTS

| | | |
|---|---|---|
| CN | 101872488 A | 10/2010 |
| CN | 102968817 A | 3/2013 |

(Continued)

OTHER PUBLICATIONS

BFB, "Axon 2 User Manual", Published on: Jan. 13, 2012, pp. 1-55. Available at: https://downloads.alibre.com/BFBAXON2-155420-214.pdf.

(Continued)

*Primary Examiner* — Darrin D Dunn
(74) *Attorney, Agent, or Firm* — International IP Law Group, PLLC

(57) ABSTRACT

The claimed subject matter includes a system and method to design 3D objects for fabrication. In embodiments, the method includes sampling coordinates of a two-dimensional object. The method also includes generating fabrication coordinates based on the sampled coordinates and a plane comprising a top layer of a three-dimensional (3D) object. Additionally, the method includes generating a 2D triangular mesh for the top layer of an overhang based on the sampled coordinates, an angle between the top layer and two points in a previous top layer border less than or equal to an overhang threshold angle.

20 Claims, 12 Drawing Sheets

(51) Int. Cl.
*G06T 11/20* (2006.01)
*G06T 17/10* (2006.01)
*B29C 64/40* (2017.01)
*B33Y 10/00* (2015.01)
*B33Y 30/00* (2015.01)
*B33Y 50/02* (2015.01)

(52) U.S. Cl.
CPC ............... *B33Y 10/00* (2014.12); *B33Y 30/00* (2014.12); *B33Y 50/02* (2014.12)

(58) Field of Classification Search
CPC ......... G06F 17/50; G06F 17/10; B33Y 50/00; B33Y 50/02; B33Y 80/00; G05B 15/02; G09G 5/28
See application file for complete search history.

(56) References Cited

U.S. PATENT DOCUMENTS

| | | | |
|---|---|---|---|
| 6,608,627 B1 * | 8/2003 | Marshall | G06T 15/02 345/619 |
| 6,644,763 B1 | 11/2003 | Gothait | |
| 6,718,291 B1 | 4/2004 | Shapiro et al. | |
| 6,850,239 B2 | 2/2005 | Mochizuki | |
| 7,009,611 B2 | 3/2006 | Di Lelle | |
| 7,095,408 B1 | 8/2006 | Lu et al. | |
| 7,324,103 B2 | 1/2008 | Stewart et al. | |
| 7,639,249 B2 * | 12/2009 | Kihslinger | G06T 17/20 345/419 |
| 7,995,863 B2 | 8/2011 | Repenning | |
| 8,219,230 B2 | 7/2012 | Sinha et al. | |
| 8,260,589 B1 | 9/2012 | Kumar | |
| 8,330,757 B2 | 12/2012 | Kataoka et al. | |
| 8,464,170 B2 * | 6/2013 | Petschnigg | G06T 19/00 715/764 |
| 8,610,720 B2 * | 12/2013 | Joshi | G06T 17/00 345/442 |
| 9,075,933 B2 * | 7/2015 | Stone | G06F 17/50 |
| 9,196,090 B2 * | 11/2015 | Maisonneuve | G06T 17/205 |
| 9,652,889 B2 * | 5/2017 | Young | G06F 17/50 |
| 9,779,528 B2 * | 10/2017 | Cohen | G06K 9/18 |
| 9,849,633 B2 * | 12/2017 | Arisoy | G06F 17/50 |
| 10,152,809 B2 * | 12/2018 | Asente | G06T 11/203 |
| 2002/0085014 A1 * | 7/2002 | Yuda | G06T 15/005 345/582 |
| 2002/0105515 A1 | 8/2002 | Mochizuki | |
| 2004/0115376 A1 * | 6/2004 | Tomczyk | B29C 45/14688 428/34.1 |
| 2004/0183796 A1 | 9/2004 | Velde et al. | |
| 2006/0032569 A1 | 2/2006 | Zimmer et al. | |
| 2006/0071948 A1 * | 4/2006 | Hemmings | G06T 3/60 345/649 |
| 2006/0262112 A1 * | 11/2006 | Shimada | G06T 17/00 345/419 |
| 2007/0257904 A1 * | 11/2007 | Gerhard | G06F 17/24 345/419 |
| 2007/0257909 A1 * | 11/2007 | Kihslinger | G06T 17/20 345/420 |
| 2007/0273706 A1 * | 11/2007 | Berger | G06T 15/04 345/582 |
| 2008/0246761 A1 * | 10/2008 | Faken | G06F 3/016 345/420 |
| 2009/0040224 A1 * | 2/2009 | Igarashi | G06T 19/00 345/427 |
| 2009/0066691 A1 * | 3/2009 | Kramer | G06T 17/10 345/419 |
| 2010/0274375 A1 * | 10/2010 | Daum | G05B 19/4097 700/98 |
| 2011/0254840 A1 * | 10/2011 | Halstead | G06T 15/04 345/421 |
| 2011/0285707 A1 * | 11/2011 | Repenning | G06T 17/10 345/419 |
| 2012/0251688 A1 | 10/2012 | Zimmerman et al. | |
| 2013/0120376 A1 | 5/2013 | Joshi et al. | |
| 2013/0120382 A1 * | 5/2013 | Joshi | G06T 17/00 345/423 |
| 2013/0120383 A1 * | 5/2013 | Joshi | G06T 17/00 345/423 |
| 2013/0301082 A1 | 11/2013 | Abeloe | |
| 2013/0307193 A1 | 11/2013 | Johnson et al. | |
| 2014/0023996 A1 | 1/2014 | Finn et al. | |
| 2014/0184599 A1 * | 7/2014 | Quilot | G06T 17/20 345/423 |
| 2014/0200698 A1 * | 7/2014 | Carbonera | G06F 17/50 700/98 |
| 2014/0375636 A1 * | 12/2014 | Young | G06F 17/50 345/420 |
| 2015/0081260 A1 | 3/2015 | Mishra et al. | |
| 2015/0147585 A1 | 5/2015 | Schwarze et al. | |
| 2015/0227642 A1 | 8/2015 | Chang et al. | |
| 2016/0078655 A1 * | 3/2016 | Cohen | G06K 9/18 345/468 |
| 2016/0171765 A1 * | 6/2016 | Mehr | G06F 17/11 345/419 |
| 2017/0270696 A1 * | 9/2017 | Schiller | G06T 11/203 |
| 2018/0147062 A1 * | 5/2018 | Ay | A61F 2/30942 |

FOREIGN PATENT DOCUMENTS

| | | |
|---|---|---|
| WO | 2009003225 A1 | 1/2009 |
| WO | 2013113372 A1 | 8/2013 |

OTHER PUBLICATIONS

Huang, Bin, "Alternate Slicing and Deposition Strategies for Fused Deposition Modelling", A Thesis Submitted to Aukland University of Technology in Fulfillment of the Requirement for the Degree of Doctorate of Philosophy, Jan. 1, 2014, 27 Pages.

International Preliminary Report on Patentability Issued in PCT Application No. PCT/US2015/017876, dated Aug. 23, 2016, 7 Pages.

"International Search Report and Written Opinion Issued in PCT Patent Application No. PCT/LiS2015/017876", dated Jul. 24, 2015, 10 Pages.

Khattak, et al., "Reconstructing 3D Buildings from LIDAR Using Level Set Methods", In Proceedings of International Conference on Computer and Robot Vision, pp. 151-158.

Pfeifer, Norbert, "A Subdivision Algorithm for Smooth 3D Terrain Models", In ISPRS Journal of Photogrammetry and Remote Sensing, Amsterdam [U.A.]; Elsevier, Amsterdam, NLvol. 59, Issue 3, Published on: May 1, 2005, pp. 115-127.

PCT International Search Report for PCT Application No. PCT/US20145/017876, dated Jul. 24, 2015, 10 pages.

"Second Written Opinion Issued in PCT Application No. PCT/US2015/017876", dated May 23, 2016, 6 Pages.

Slabaugh, et al., "A Contour-Based Approach to 3D Text Labeling on Triangulated Surfaces", In Proceedings of Fifth International Conference on 3-D Digital Imaging and Modeling, Jun. 13, 2005, 8 pages.

Wang, et al., "3D Reconstruction of Curved Objects from Single 2D Line Drawings", In Proceedings of IEEE Conference on Computer Vision and Pattern Recognition, Jun. 20, 2009, pp. 1834-1841.

Restriction Requirement, issued in U.S. Appl. No. 14/195,174, dated Apr. 5, 2016, 9 pages.

Non-Final Office Action, issued in U.S. Appl. No. 14/195,174, dated Apr. 5, 2016, 9 pages.

Notice of Allowance, issued in U.S. Appl. No. 14/195,174, dated Mar. 23, 2017, 15 pages.

"Office Action and Search Report Issued iN US Patent Application No. 201580011780.2", dated May 2, 2018, 7 Pages.

"Office Action Issued in Chinese Patent Application No. 201580011780.2", dated Nov. 9, 2016, 2 Pages.

"Second Office Action Issued in Chinese Patent Application No. 201580011780.2", dated Nov. 30, 2018, 8 Pages.

* cited by examiner

200

500

FABRICATING THREE-DIMENSIONAL OBJECTS WITH OVERHANG

CROSS-REFERENCE TO RELATED APPLICATIONS

This application is a continuation of U.S. patent application Ser. No. 14/195,174, filed Mar. 3, 2014, and entitled "FABRICATING THREE-DIMENSIONAL OBJECTS WITH OVERHANG", the application of which is incorporated herein in its entirety by reference.

BACKGROUND

Three-dimensional (3D) objects may be fabricated in various ways, including printing and additive manufacturing processes, such as fused deposition modeling. With regard to 3D printing, 3D printers sometimes have difficulty fabricating objects with overhangs. Overhangs are protrusions from the body of the printed object. Such overhangs may be common with printing personalized objects, e.g., a printed trophy customized with text identifying the winner. The layer-by-layer construction process does not provide enough support to material that overhangs above at such angles. As such, the protruding material may lose its shape, or even fall off the printed object. One approach to this challenge involves providing external structures that support the overhangs during printing or manufacturing. This approach also involves manually removing the structures once the object is completed. Thus, this manual approach is slow, tedious, and resource intensive.

SUMMARY

The following presents a simplified summary of the innovation in order to provide a basic understanding of some aspects described herein. This summary is not an extensive overview of the claimed subject matter. It is intended to neither identify key elements of the claimed subject matter nor delineate the scope of the claimed subject matter. Its sole purpose is to present some concepts of the claimed subject matter in a simplified form as a prelude to the more detailed description that is presented later.

A system and method to design 3D objects for fabrication. Embodiments include a method that samples coordinates of a two-dimensional object. The method also includes generating fabrication coordinates based on the sampled coordinates and a plane comprising a top layer of a three-dimensional (3D) object. Additionally, the method includes generating a 2D triangular mesh for the top layer of an overhang based on the sampled coordinates, where an angle between the top layer and two points in a previous top layer border is less than or equal to an overhang threshold angle.

In embodiments, a system that designs 3D objects for fabrication includes a processing unit and a system memory. The system memory stores code configured to direct the processing unit to sample coordinates of a two-dimensional (2D) object. Fabrication coordinates are generated based on the sampled coordinates and a plane comprising a top layer of a three-dimensional (3D) object. Coordinates of a projected curve are sampled. Coordinates of a segment of the 2D object are sampled. A 2D triangular mesh is generated for the top layer of an overhang based on the sampled coordinates, where an angle between the top layer and two points in a previous top layer border is less than or equal to an overhang threshold angle. The top layer has a z1 value, where z1>z2. The z2 layer is disposed beneath the top layer. The top layer includes specific text in a specific font.

Embodiments include one or more computer-readable storage memory devices for storing computer-readable instructions. The computer-readable instructions provide a 3D object design system when executed by one or more processing devices. The computer-readable instructions include code configured to sample coordinates of a two-dimensional (2D) object. Fabrication coordinates are generated based on the coordinates and a plane comprising a top layer of a three-dimensional (3D) object. Coordinates of a projected curve are sampled. Coordinates of a segment of the 2D object are sampled. A 2D triangular mesh is generated for the top layer of an overhang based on the sampled coordinates, where an angle between the top layer and two points in a previous top layer border is less than or equal to an overhang threshold angle. The plane includes a z1 plane where z1>z2, and z2 is disposed a layer beneath the top layer. The top layer includes specific text in a specific font. The 3D object is a personalized award.

The following description and the annexed drawings set forth in detail certain illustrative aspects of the claimed subject matter. These aspects are indicative, however, of a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 1:
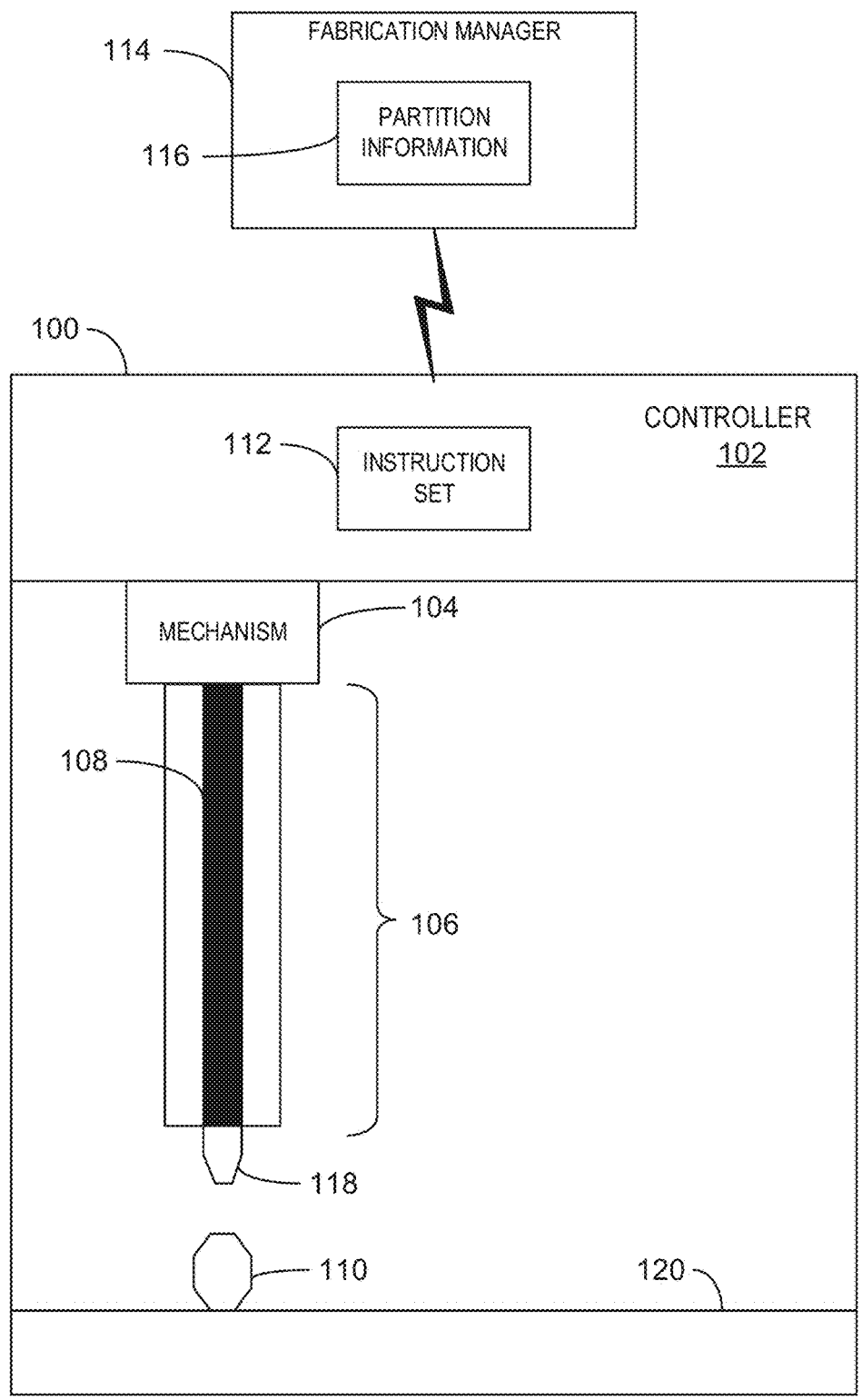
FIG. 1 is a block diagram of an example fabricator for transforming a 3D model into instructions for fabricating a 3D object with overhang according to embodiments described herein.

As a preliminary matter, some of the Figures describe concepts in the context of one or more structural components, variously referred to as functionality, modules, features, elements, or the like. The various components shown in the Figures can be implemented in any manner, such as software, hardware, firmware, or combinations thereof. In some embodiments, various components reflect the use of corresponding components in an actual implementation. In other embodiments, any single component illustrated in the Figures may be implemented by a number of actual components. The depiction of any two or more separate components in the Figures may reflect different functions performed by a single actual component. FIG. 1, discussed below, provides details regarding one system that may be used to implement the functions shown in the Figures.

Other Figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into multiple component blocks, and certain blocks can be performed in an order that differs from that which is illustrated herein, including a parallel manner of performing the blocks. The blocks shown in the flowcharts can be implemented by software, hardware, firmware, manual processing, or the like. As used herein, hardware may include computer systems, discrete logic components, such as application specific integrated circuits (ASICs), or the like.

As to terminology, the phrase "configured to" encompasses any way that any kind of functionality can be constructed to perform an identified operation. The functionality can be configured to perform an operation using, for instance, software, hardware, firmware, or the like. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may include communication media such as transmission media for wireless signals and the like.

The following describes example embodiments of a printing tool configured to extrude material during three-dimensional (3D) object fabrication. Embodiments described herein are generally directed towards a fabrication manager configured to generate an instruction set that causes fabrication of a 3D object. The instruction set describes the path the fabricator follows to create the 3D object (the tool path). The instruction set provides the (x, y, z) positions where extrudable material is deposited, the amount of material deposited, and associated information.

FIG. 1 is a block diagram of an example fabricator 100 for transforming a 3D model into instructions for fabricating a 3D object with overhang according to embodiments described herein. The fabricator 100 may include a control unit or controller 102 coupled to a first mechanism 104 and can be configured to execute instructions for the first mechanism 104 and a second mechanism 106. A chamber 108 constructed within the second mechanism 106 allows colored materials to be prepared, e.g., heated and blended, when fabricating an object 110. For example, the chamber 108 is used for melting and extruding filaments, or other compatible materials.

The first mechanism 104 may be referred to as a robotic mechanism, e.g., a gantry robot, including various mechanical or electro-mechanical components. By executing at least some instructions within an instruction set 112, the first mechanism 104 may actuate these components into performing at least some physical movement. The fabrication manager 114 may generate the instruction set 112 by partitioning a 3D model into layers and providing specific fabrication instructions for each layer. When actuated, these components may move horizontally, vertically, diagonally, rotationally, and so forth. One example implementation of the first mechanism 104 moves a printing mechanism or tool across an x, y, or z-axis in order to deposit material at a specific position within the object 110 being fabricated.

The second mechanism 106 may be referred to as a printing mechanism that includes one or more printing tool heads. The material may be pushed or pulled into a printing tool head, and the motors may be mounted further away in order to push the material through a thin guide tube into the chamber 108. Although the second mechanism 106 may resemble an extruder configuration, e.g., a single extruder head configuration, it is appreciated that the second mechanism 106 represents any compatible technology, including legacy printing tool heads. Furthermore, the second mechanism 106 may include printing tool heads configured to deposit other materials in addition to colored materials and transparent materials.

The instructions mentioned above, which are stored in an instruction set 112, may be collectively referred to as coordinated instructions because such instructions are executed in coordination with multiple components. For example, instructions for different stepper motors in an extruder configuration may be coordinated such that an appropriate extrudable material is fed into the chamber 108. Accordingly, an instruction for one stepper motor may be synchronized in time with an instruction for another stepper motor such that both stepper motors can operate in coordination with each other.

The fabrication manager 114 may include hardware and software components operating on various embodiments of computing devices, such as a remote computing device and an attached computing device. One example implementation of the fabrication manager 114 processes captured volumetric sensor data, corresponding to an object being fabricated, in a 3D model and partitions that information into layers in which each layer includes at least some geometry, which may include geometric elements corresponding to a surface mesh. The present disclosure may use "partition", "slice", or another similar term in place of "layer," and it is appreciated that these terms be defined as interchangeable.

Within partition information 116, the fabrication manager 114 stores a data structure corresponding to the 3D model. Geometry generally refers to a set of geometric elements, such as a 3D polyhedron or other shape, which may represent an amount of extrudable material to be deposited. One example measure represents at least a portion of the geometry—and therefore, the amount of extrudable material—volumetrically. The example measure may define a portion of the geometry using standardized units in which each unit represents a minimal amount, e.g., volume, of colored material at a given time instance, such as by an extrusion width. Each geographic element may include one or more standardized units.

The fabrication manager 114 is configured to generate instructions that, when executed by the controller 102, actuate components of the first mechanism 104, which may result in movements of the second mechanism 106 following a surface geometry, e.g., an exterior shell of the object 110.

Optionally, a movable platform, such as a platform 120, functions as a mechanism for printing the object 110. The first mechanism 104 may operate the platform 120 to guide the object 110 and the nozzle 118 to each other. The instruction set 112 may include instructions for automatically calibrating the platform 120 such that through a series of movements in an x, y, and z direction or in rotation across an x-y plane, the 3D object 110 is moved to a correct position for the nozzle 118 to deposit material.

Some example embodiments of the fabricator 100 include legacy devices that are retrofitted with at least some of the components described herein, including the controller 102, the fabrication manager 114, and a printing tool head, such as the second mechanism 106. As one option, the fabricator 100 may include an additional microprocessor to manage the set of motors and to receive a signal from an original microprocessor when a command is processed.

To illustrate one example, a verified manifold object, represented in a 3D mesh model, may be partitioned into layers by processing each polygon representing the object, and projecting each polygon through a slicing plane. This projection generates a point and connection to other points in a manner that eventually creates a path. From this point, the path is reduced to units, e.g., volumetric measures of geometric elements, representing addressable units for a specific hardware characteristic of a corresponding fabricator. The units may not be the same size, axis aligned, and the same size in each dimension. One example implementation may utilize non-cubic units of different sizes along an x, y, or z axis, which enables different effective resolutions per dimension. According to one example implementation, the partition information 116 may include voxelized data such that each addressable (voxel) unit includes a variety of information, such as color, texture, and lighting values, for geometry within that addressable voxel unit.

An example fabricator 100 includes an arrangement of motors and a tool head having a mixing chamber and a nozzle. The tool head also may include a heating element for melting extrudable material to a prescribed temperature.

Figure 2:
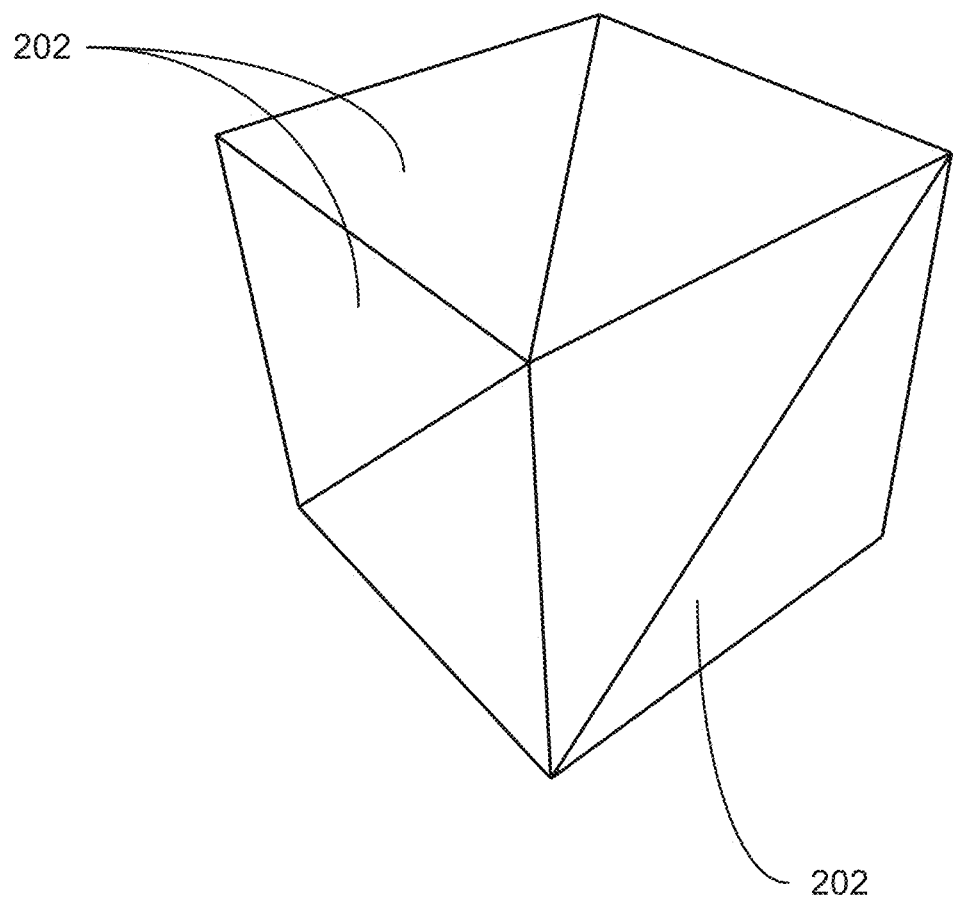
FIG. 2 is a schematic showing an example 3D model that may be used according to embodiments described herein.

FIG. 2 is a schematic showing an example 3D model that may be used according to embodiments described herein. The 3D model 200 is represented as a mesh including faces 202. In the embodiment shown in FIG. 2, the faces 202 are made up of triangles. However, the faces 202 may be made up of rectangles or other polygon types.

When fabricating the 3D object, the fabrication manager 114 determines an approximate amount of extrudable material capable of being deposited at a given (x, y, z) location. The fabrication manager 114 uses the determined amount to define addressable units on the object's shell. Each unit represents a specific geometric element or a portion of the 3D object. Color resolution also may increase or decrease depending on unit size. This technique may be applied to the object's entire volume, including the outer shell.

Figure 3A:
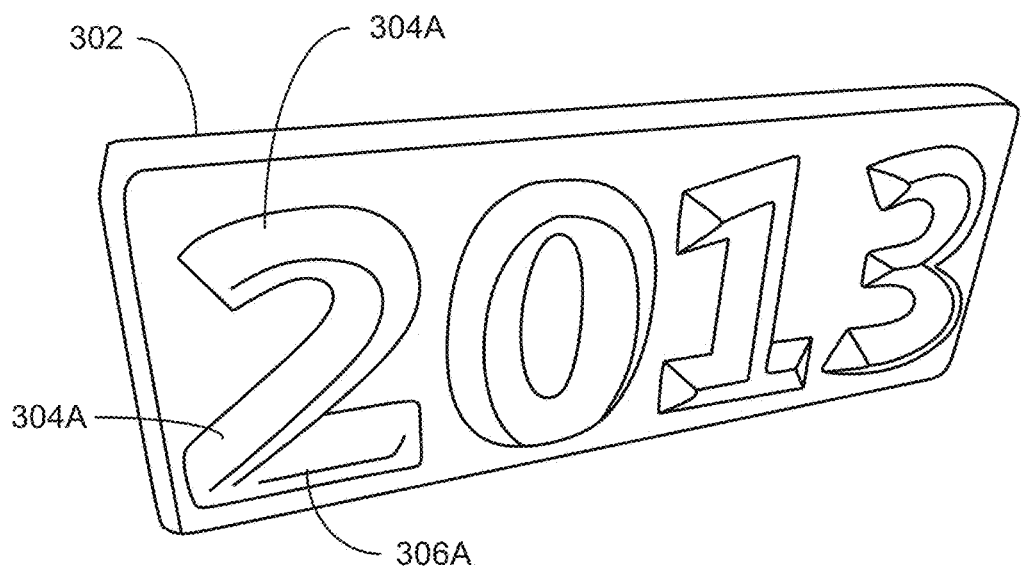
FIGS. 3A-3B are block diagrams of example 3D objects fabricated according to embodiments described herein.
Figure 3B:
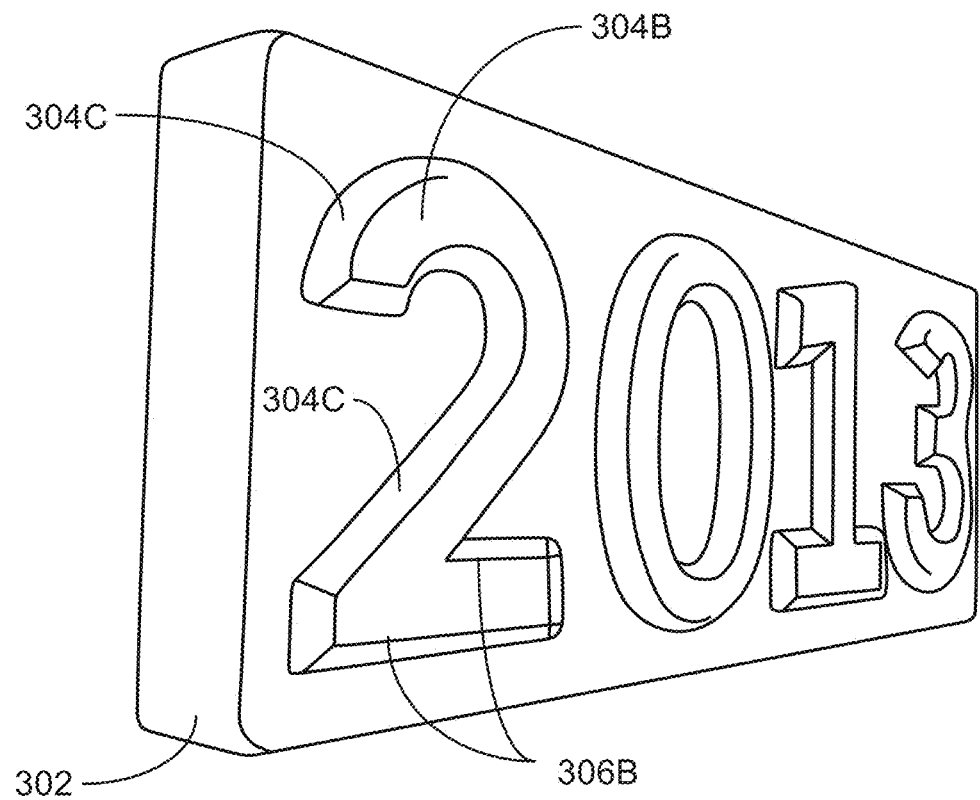

FIGS. 3A-3B are block diagrams of example 3D objects 300A, 300B fabricated according to embodiments described herein. The object 300A includes a 3D text protruding from a block base 302A. The design of the object 300A includes text fabricated with a "roof" for each letter. The roof includes chamfers 304A and a centerline ridge 306A. A chamfer is a beveled edge that connects two surfaces. In FIG. 3A, the angle of the overhang, e.g., the chamfers 304A, in relation to the block base 302A, is 45 degrees. This angle can be supported by the thus-far fabricated object 300A as each layer is deposited. FIG. 3B includes the base object 302B, and chamfers 304B and 304C creating ridges 306B. The angles of the chamfers 304B are less than 45 degrees, which provides the appearance of a flat roof structure. It is noted that 45 degrees is an example of an overhang threshold angle, which may be pre-determined. The overhang threshold angle is the angle at or below which the overhang maintains the structure of the 3D object without external support.

The addressable units may be represented herein as voxelized data, e.g., voxelized data structure. In an example implementation, the fabrication manager 114 determines volume in voxel units, e.g., volumetric pixels. The fabricator's 3D space is factored by a minimum volume of extrudable material. Other information may include implicit values such as distance to an object surface mesh or probabilities indicating whether a voxel unit of the object occupies the volume represented.

Figure 4:
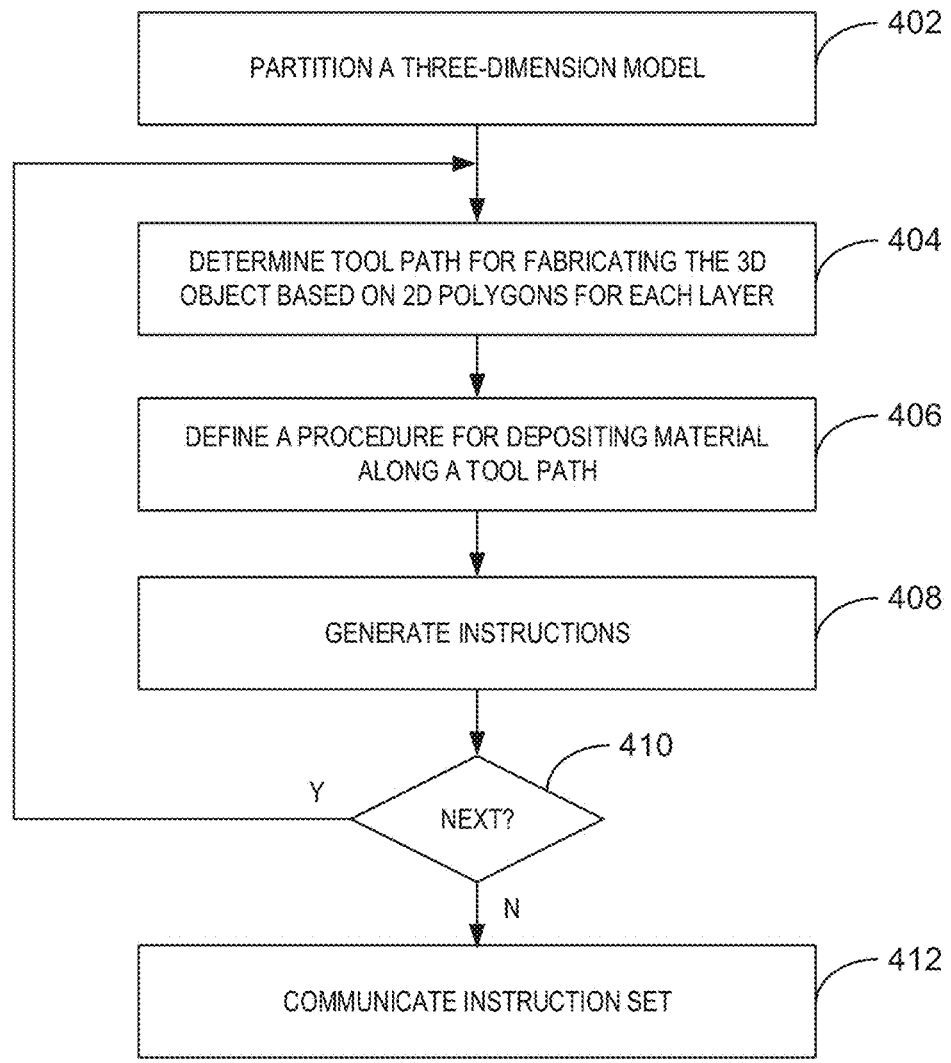
FIG. 4 is a process flow of a method for designing a 3D model of text for fabrication according to embodiments described herein.

FIG. 4 is a process flow of a method 400 for designing a 3D model of text for fabrication according to embodiments described herein. One or more components of hardware or software, e.g., the fabrication manager 114, may be configured to perform the method 400. The method 400 begins at block 402 where a 3D model may be partitioned into layers.

At block 404, the fabrication manager 114 generates a tool path for fabricating the 3D object. The tool path is based on 2D polygons that serve as the structure of each layer. Geometric elements, such as 2D polygons are generated for each layer based on faces, colors, textures, gradients, and the like. The fabrication manager 114 decomposes each layer into 2D polygons, and projects each element onto the layer's plane, forming the object's shell. The 2D polygons may include faces, colors, textures, and gradients.

At block 406, a procedure may be defined for depositing extrudable material along a tool path. The procedure may involve moving a printing tool according to a tool path. One example implementation determines, for each unit, a stepper motor speed at which extrudable materials are fed into the printing tool while that tool follows the tool path and moves the printing tool head to that unit's location on the object being fabricated. At block 408, the instruction set 112 is generated for the fabricator 100. The instruction set 112 directs the tool device to apply extrudable material for all 2D polygons. The instruction set 112 includes coordinated instructions for the depositing procedure and the tool path.

After allowing the deposited material to cool or dry, the fabrication manager 114 may determine whether to fabricate another layer at block 410. If there are more layers in the model, the method 400 returns to block 404. Otherwise, the method 400 proceeds to block 412, where the coordinated instruction set 112 may be communicated to the fabricator 100.

This process flow diagram is not intended to indicate that the blocks of the method 400 are to be executed in any particular order, or that all of the blocks are to be included in every case. Further, any number of additional blocks not shown may be included within the method 400, depending on the details of the specific implementation.

One example implementation generates example coordinated instructions, e.g., op codes, g-code and the like, to drive a robotic mechanism, e.g., the first mechanism 104, and deposit materials using the printing tool, e.g., the second mechanism 106. The printing tool includes a head with a nozzle and a set of motors, which can be local or remote. A controller configures a tool-set or coordinated instruction set for each Z layer that, when executed, causes the robotic mechanism to move the printing tool head to an area where the printing mechanism deposits a combination of one or more materials.

Figure 5:
FIG. 5 is a block diagram showing a 3D model of an example roof structure according to embodiments described herein.

FIG. 5 is a block diagram 500 of an example roof fabrication over text according to embodiments described herein. In various embodiments, to represent the object's geometry, the fabrication manager 114 partitions the object's 3D model, e.g., a mesh model, into layers along a Z-axis. Each Z layer represents units in an X-Y plane of the 3D object. The units represent specific 3D spaces where extrudable material is filled.

3D printing uses many 3D models with varying thicknesses. As such, 3D text is generated from 2D triangular mesh by duplicating the 2D polygons with a different "z" value. For example, z is set to a positive delta in order to provide for a bottom layer and a top layer. For the top layer, a roof or offset is generated with an angle less than 45 degrees. There are two different visual effects. One effect is to create the roof of the bottom polygons for a sharp roof, e.g., object 300A. The other effect is to create certain offset inside the top polygon so the top layer has a smaller flat roof with a slope. The angles vary across implementations of the claimed subject matter. This same technique can be used for engraving as well as embossing.

The top layer is processed to find the roof (or offset). A Delauney triangulation is performed on the top layer. A Delaunay triangulation for a set P of points in a plane is a triangulation DT(P) such that no point in P is inside the circumcircle of any triangle in DT(P). Delaunay triangulations maximize the minimum angle of all the angles of the triangles in the triangulation. The original polygons are constraints for the outer boundaries, but there also inner constraints from the roof, created by the straight skeleton. The fabrication manager 114 ensures triangulation does not refine any segment of the original outer polygon. Accordingly, the triangles from both top layer and bottom layer are merged into one triangular mesh, in order to get the 3D triangular text mesh to print.

Each layer includes a 3D voxelized data structure based on the units included therein, and is represented by lines 502. Each layer may be represented as a set of addressable units which include at least a portion of a geometric element. Geometric elements generally refer to polygons projected onto a plane as paths having at least some volume. The paths may form an exterior shell of the object being fabricated.

Figure 6A:
FIGS. 6A-6D are block diagrams representing methods for designing a 3D model of text for fabrication.

FIGS. 6A-6D are block diagrams representing methods for designing a 3D model of example text 600A-600D, designed for fabrication according to embodiments described herein. In FIG. 6A, the fabrication manager 114 retrieves 2D geometric segments for the 3D object. Text contours may be represented by segments 602A and geometric segments 604A for the TrueType Font.

Figure 6B:
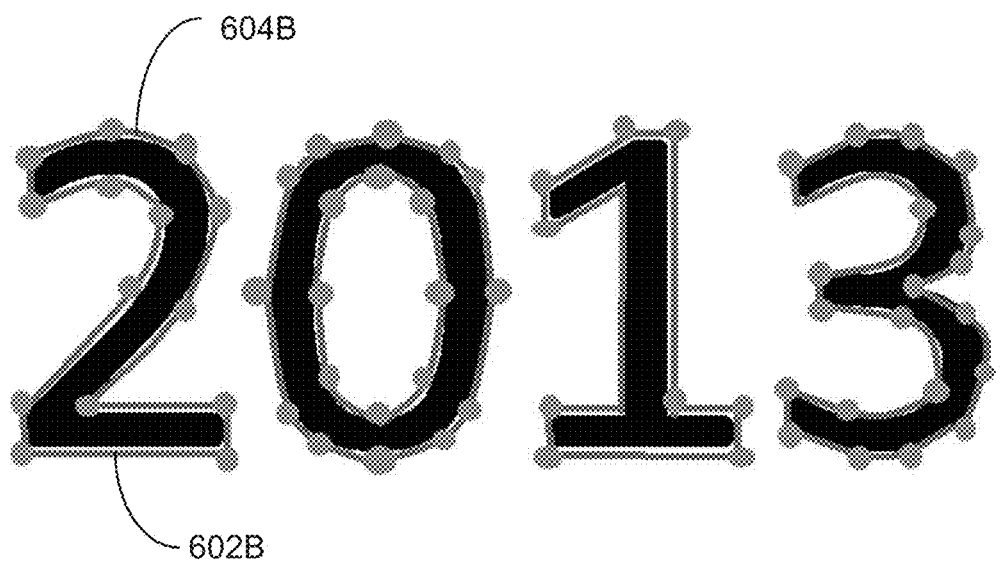

In FIG. 6B, the geometric segments are sampled. In 3D printing, fabricating curved surfaces is challenging. As such, triangular mesh based geometry representation is typically used. This approach converts curves to straight line segments 602B by sampling the Bezier curves 604B to get coordinates. It is noted that Bezier curves are merely an example of how geometric segments are being sampled. The coordinates used for 2D polygons simulate the original curved geometric segments 604A.

Figure 6C:
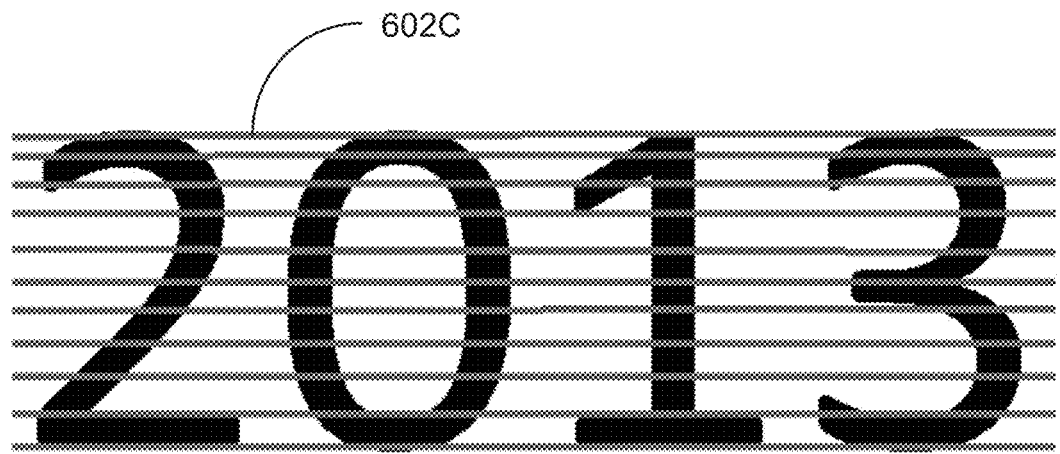

In FIG. 6C, the fabrication manager samples 2D points of the text 600. This may be performed with image segmentation or similar 2D sampling. Logo images are frequently converted from 2D images to 3D text objects. Likewise, text from bitmap-only fonts may need to be converted into its geometric-segments equivalent. Accordingly, standardized image segmentation may be used to derive the 2D polygons in text 600C of FIG. 6C directly from the 2D images of text. Alternatively, the fabrication manager 114 may perform a sweep line 602C procedure to get the intersection pixels and convert to 2D coordinates. Using these techniques, the fabrication manager 114 can extract consistent input data to be used throughout the rest of the fabrication design.

Figure 6D:
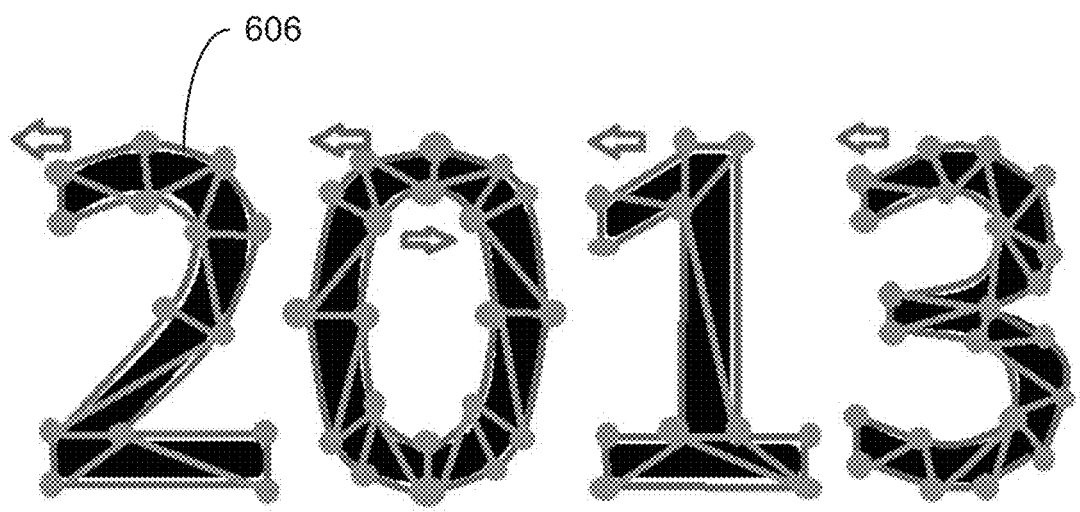

In FIG. 6D, a 2D triangular mesh is generated using a triangulation method. Delauney triangulation uses 2D segments 602A and sampled coordinates of Bezier curves of geometric segments 604A to represent the text. In the triangular mesh, the triangle orientation (i.e., the clockwise or counter-clockwise order of declaration of the triangle vertices), when declared consistently and accurately, indicates whether individual polygons 606 are solid or empty. For example, the "0" has a hole in the middle because the orientation of the polygon is negative when using the right-hand rule. When using the left-hand rule, the reverse is true. It is noted that this is mathematically equal to one of the fill rules, but different fill rules may be used in the alternative.

Figure 7:
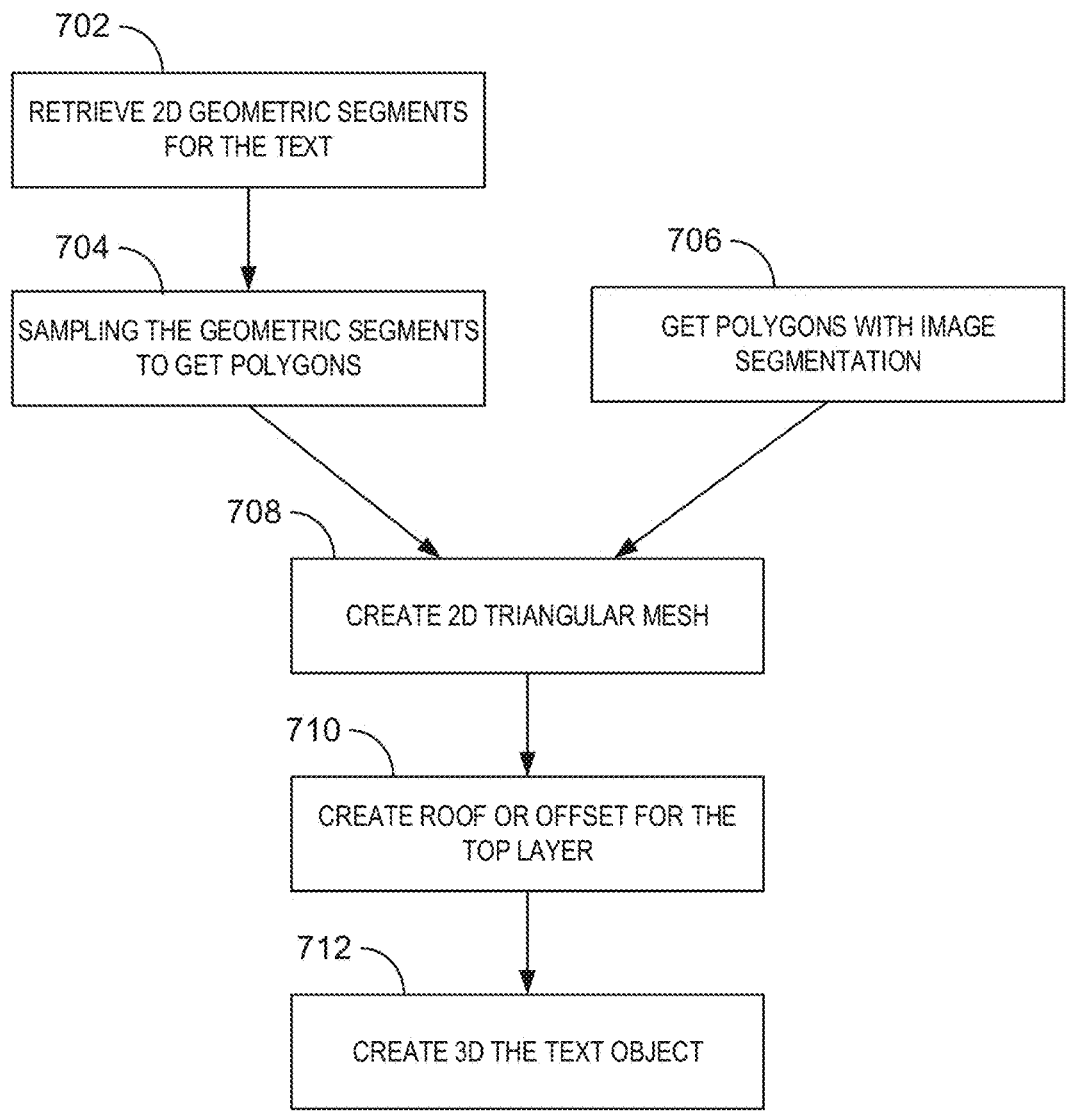
FIG. 7 is a process flow of a method for designing a 3D model of text for fabrication, in accordance with the claimed subject matter.

FIG. 7 is a process flow of diagram a method 700 for designing a 3D model of text for fabrication, in accordance with the claimed subject matter. The method 700 may be performed by the fabrication manager 114. The method begins at block 702, where 2D Bezier curves, for example, are identified for curves in a text. Based on the Bezier curve of a letter or shape, a transformation is determined for creating a 3D object from 2D text. The fabrication manager 114 finds the outer edge of the shape or font using image segmentation. A Bezier curve of the object is determined. For a mid-point offset, for example, the shape between the edges is determined to have a 45° angle between the edge and the center point, extruding the 2D shape to a 3D shape.

At block 704 the curves are sampled to determine polygons. In parallel, at block 706, polygons are determined based on sampling the straight segments in the text. Image segmentation may be used. At block 708, the 2D triangular mesh is created from the sampled curves and segments. At block 710, an offset is created for the top layer of the 3D object. At block 712, the 3D text object is created.

Advantageously, 3D text may be used for various fonts. Additionally, the 3D text is self-supported because it never has an angle from layer to layer of more than 45°, saving the cost and time of external support structures. Further, the method 700 is not limited to textual fabrications. Rather, the techniques described herein may be applied to various shapes.

When the offset is equal to half of the width of the polygon 606, the straight skeleton algorithm can use this information to design the roof of such a building. Additionally, the straight skeleton algorithm can draw the centerline ridge 306A. Except for calculating the roof, the shrinking process of the straight skeleton algorithm can provide the capability to achieve the 2nd effect by just stopping shrinking at a specified height.

Figure 8:
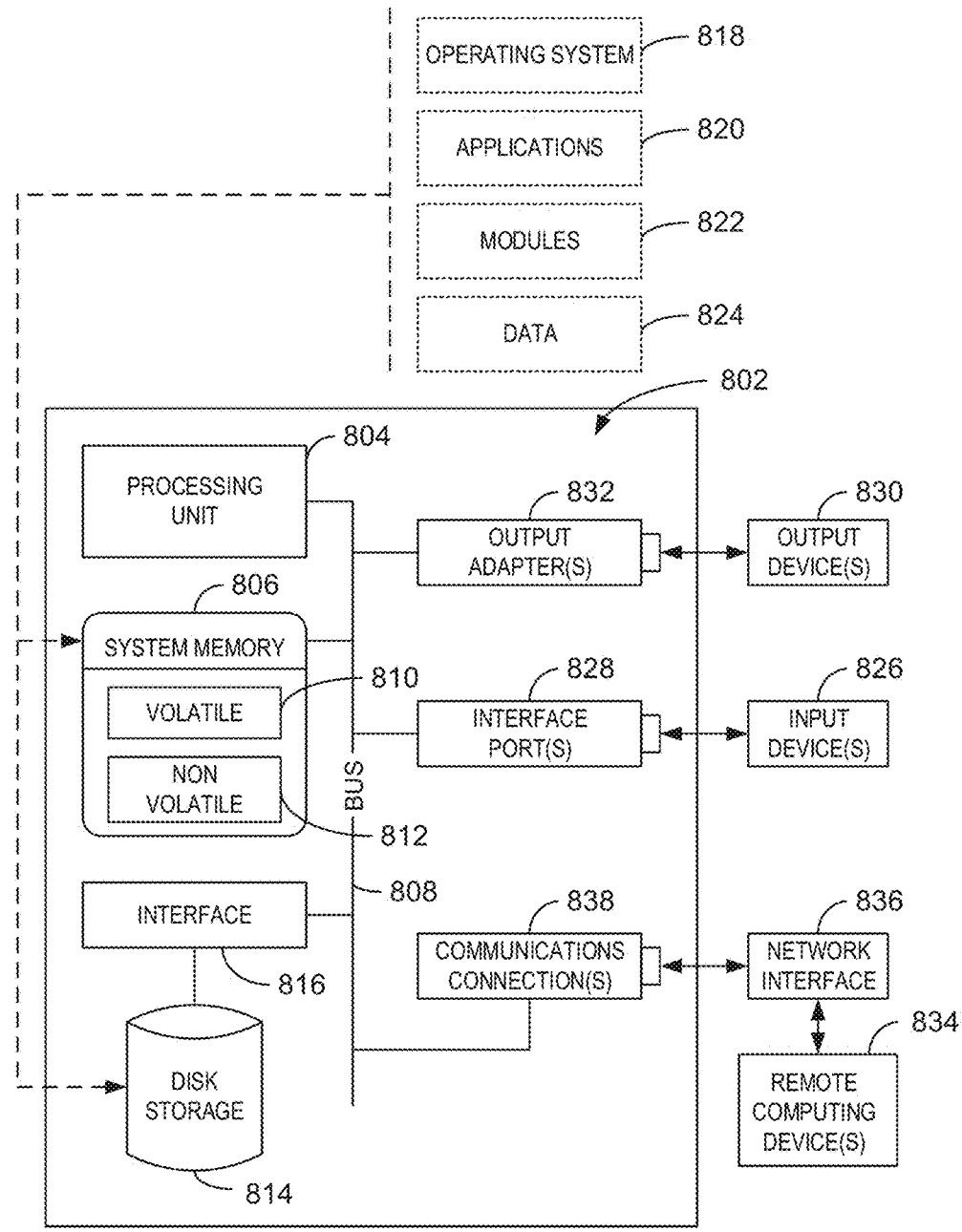
FIG. 8 is a block diagram of an exemplary operating environment for implementing various aspects of the claimed subject matter.

In order to provide context for implementing various aspects of the claimed subject matter, FIG. 8 is intended to provide a brief, general description of a computing environment in which the various aspects of the claimed subject matter may be implemented. For example, a method and system for fabricating 3D objects can be implemented in such a computing environment. While the claimed subject matter has been described above in the general context of computer-executable instructions of a computer program that runs on a local computer or remote computer, the claimed subject matter also may be implemented in combination with other program modules. Generally, program modules include routines, programs, components, data structures, or the like that perform particular tasks or implement particular abstract data types.

FIG. 8 is a block diagram of an exemplary operating environment for implementing various aspects of the claimed subject matter. The exemplary operating environment 800 includes a computer 802. The computer 802 includes a processing unit 804, a system memory 806, and a system bus 808.

The system bus 808 couples system components including, but not limited to, the system memory 806 to the processing unit 804. The processing unit 804 can be any of various available processors. Dual microprocessors and other multiprocessor architectures also can be employed as the processing unit 804.

The system bus 808 can be any of several types of bus structure, including the memory bus or memory controller, a peripheral bus or external bus, and a local bus using any variety of available bus architectures known to those of ordinary skill in the art. The system memory 806 includes computer-readable storage media that includes volatile memory 810 and nonvolatile memory 812.

The basic input/output system (BIOS), containing the basic routines to transfer information between elements within the computer 802, such as during start-up, is stored in nonvolatile memory 812. By way of illustration, and not limitation, nonvolatile memory 812 can include read only memory (ROM), programmable ROM (PROM), electrically programmable ROM (EPROM), electrically erasable programmable ROM (EEPROM), or flash memory.

Volatile memory 810 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), SynchLink™ DRAM (SLDRAM), Rambus® direct RAM (RDRAM), direct Rambus® dynamic RAM (DRDRAM), and Rambus® dynamic RAM (RDRAM).

The computer 802 also includes other computer-readable media, such as removable/non-removable, volatile/nonvolatile computer storage media. FIG. 8 shows, for example a disk storage 814. Disk storage 814 includes, but is not limited to, devices like a magnetic disk drive, floppy disk drive, tape drive, Jaz drive, Zip drive, LS-210 drive, flash memory card, or memory stick.

In addition, disk storage 814 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 814 to the system bus 808, a removable or non-removable interface is typically used such as interface 816.

It is to be appreciated that FIG. 8 describes software that acts as an intermediary between users and the basic computer resources described in the suitable operating environment 800. Such software includes an operating system 818.

Operating system 818, which can be stored on disk storage 814, acts to control and allocate resources of the computer 802.

System applications 820 take advantage of the management of resources by operating system 818 through program modules 822 and program data 824 stored either in system memory 806 or on disk storage 814. It is to be appreciated that the claimed subject matter can be implemented with various operating systems or combinations of operating systems.

A user enters commands or information into the computer 802 through input devices 826. Input devices 826 include, but are not limited to, a pointing device, such as a mouse, trackball, stylus, and the like, a keyboard, a microphone, a joystick, a satellite dish, a scanner, a TV tuner card, a digital camera, a digital video camera, a web camera, and the like. The input devices 826 connect to the processing unit 804 through the system bus 808 via interface ports 828. Interface ports 828 include, for example, a serial port, a parallel port, a game port, and a universal serial bus (USB).

Output devices 830 use some of the same type of ports as input devices 826. Thus, for example, a USB port may be used to provide input to the computer 802, and to output information from computer 802 to an output device 830.

Output adapter 832 is provided to illustrate that there are some output devices 830 like monitors, speakers, and printers, among other output devices 830, which are accessible via adapters. The output adapters 832 include, by way of illustration and not limitation, video and sound cards that provide a means of connection between the output device 830 and the system bus 808. It can be noted that other devices and systems of devices provide both input and output capabilities such as remote computers 834.

The computer 802 can be a server hosting various software applications in a networked environment using logical connections to one or more remote computers, such as remote computers 834. The remote computers 834 may be client systems configured with web browsers, PC applications, mobile phone applications, and the like.

The remote computers 834 can be a personal computer, a server, a router, a network PC, a workstation, a microprocessor based appliance, a mobile phone, a peer device or other common network node and the like, and typically includes many or all of the elements described relative to the computer 802.

The operating environment 800 is illustrated with remote computers 834. Remote computers 834 are logically connected to the computer 802 through a network interface 836 and then connected via a wireless communication connection 838.

Network interface 836 encompasses wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connections 838 refers to the hardware/software employed to connect the network interface 836 to the system bus 808. While communication connection 838 is shown for illustrative clarity inside computer 802, it can also be external to the computer 802. The hardware/software for connection to the network interface 836 may include, for exemplary purposes, internal and external technologies such as, mobile phone switches, modems including regular telephone grade modems, cable modems and DSL modems, ISDN adapters, and Ethernet cards.

An exemplary processing unit 804 for the server may be a computing cluster. The disk storage 814 may comprise an enterprise data storage system, for example, holding thousands of impressions.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component, e.g., a functional equivalent, even though not structurally equivalent to the disclosed structure, which performs the function in the herein illustrated exemplary aspects of the claimed subject matter. In this regard, it will also be recognized that the innovation includes a system as well as a computer-readable storage media having computer-executable instructions for performing the acts and events of the various methods of the claimed subject matter.

There are multiple ways of implementing the claimed subject matter, e.g., an appropriate API, tool kit, driver code, operating system, control, standalone or downloadable software object, etc., which enables applications and services to use the techniques described herein. The claimed subject matter contemplates the use from the standpoint of an API (or other software object), as well as from a software or hardware object that operates according to the techniques set forth herein. Thus, various implementations of the claimed subject matter described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and additional components, and according to various permutations and combinations of the foregoing. Sub-components can also be implemented as components communicatively coupled to other components rather than included within parent components (hierarchical).

Additionally, it can be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the claimed subject matter may have been disclosed with respect to one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A method for creating a three-dimensional (3D) model of a feature from a two-dimensional (2D) image, and integrating the 3D model of the feature into a 3D object model that can be manufactured without requiring support material, the method comprising:
    identifying an edge of a shape of the 2D image;
    determining a curve that substantially fits the edge of the 2D image shape;
    sampling the curve to determine coordinates on the curve;
    generating straight-line segments between the determined coordinates;
    generating a 2D triangular mesh of the 2D image shape based on the straight-line segments;
    determining a height of a third dimension based on at least one of a distance between two coordinates on the curve, a chamfer angle, and a specified height;
    transforming the 2D triangular mesh of the 2D image shape into a 3D model feature by duplicating 2D polygons of the 2D triangular mesh;
    adjusting the duplicated 2D polygons to fit a surface area of the determined height;
    merging the 2D polygons of the 2D triangular mesh with the adjusted duplicated 2D polygons to create a 3D triangular mesh of the 3D model feature of the 2D image shape; and
    merging the 3D triangular mesh of the 3D model feature with a 3D triangular mesh of the 3D object model.

2. The method of claim 1, comprising determining an offset of a layer of the 3D object model from a 3D object based on the height of the third dimension and the adjustment made to form the adjusted duplicated 2D polygons.

3. The method of claim 2, wherein the offset of the layer of the 3D object model from the 3D object results in an offset with an angle less than 45 degrees relative to a surface of the 3D object.

4. The method of claim 1, wherein generating the 2D triangular mesh of the 2D image shape uses a triangulation method based on the determined coordinates on the curve.

5. The method of claim 1, wherein the 3D model comprises ridges formed by intersecting chamfers, the chamfer having angles less than 45 degrees relative to a 3D object.

6. The method of claim 1, wherein the merging of the 2D polygons of the 2D triangular mesh with the adjusted duplicated 2D polygons does not refine any segment of an original outer polygon of a 3D object.

7. The method of claim 1, comprising fabricating the 3D object model with extrudable material to match with an outer surface of the 3D object model of a 3D object.

8. The method of claim 7, wherein the 3D object model comprises a projection of specific text that is embossed on a side, top, or bottom of the 3D object.

9. A system for creating a three-dimensional (3D) model of a feature from a two-dimensional (2D) image, and integrating the 3D model of the feature into a 3D object model that can be manufactured without requiring support material, comprising:
    a processing unit; and
    a system memory, wherein the system memory comprises code configured to direct the processing unit to:
    identify an edge of a shape of the 2D image;
    determine a curve that substantially fits the edge of the 2D image shape;
    sample the curve to determine coordinates on the curve;

generate straight-line segments between the determined coordinates;
generate a 2D triangular mesh of the 2D image shape based on the straight-line segments;
determine a height of a third dimension based on at least one of a distance between two coordinates on the curve, a chamfer angle, and a specified height;
transform the 2D triangular mesh of the 2D image shape into a 3D model feature by duplicating 2D polygons of the 2D triangular mesh;
adjust the duplicated 2D polygons to fit a surface area of the determined height;
merge the polygons of the 2D triangular mesh with the adjusted duplicated 2D polygons to create a 3D triangular mesh of the 3D model feature of the 2D image shape; and
merge the 3D triangular mesh of the 3D model feature with a 3D triangular mesh of the 3D object model.

10. The system of claim 9, wherein the system memory comprises code configured to direct the processing unit to determine an offset of a layer of the 3D object model from a 3D object based on the height of the third dimension and the adjustment made to form the adjusted duplicated 2D polygons.

11. The system of claim 10, wherein the offset of the layer of the 3D object model from a 3D object results in an offset with an angle less than 45 degrees relative to a surface of the 3D object.

12. The system of claim 9, wherein generating the 2D triangular mesh of the 2D image shape uses a triangulation method based on the determined coordinates of the curve.

13. The system of claim 9, wherein the 3D model comprises ridges formed by intersecting chamfers, the chamfer having angles less than 45 degrees relative to a 3D object.

14. The system of claim 9, wherein the merging of the 2D polygons of the 2D triangular mesh with the adjusted duplicated 2D polygons does not refine any segment of an original outer polygon of a 3D object.

15. The system of claim 9, wherein the system memory comprises code configured to direct the processing unit to fabricate the 3D object model with extrudable material to match with an outer surface of the 3D object model of a 3D object.

16. One or more computer-readable memory storage devices that store computer-readable instructions for creating a three-dimensional (3D) model of a feature from a two-dimensional (2D) image, and integrating the 3D model of the feature into a 3D object model that can be manufactured without requiring support material, the instructions when executed by one or more processing devices are configured to:

determine a 2D line based on a plurality of boundaries of a 2D object, wherein the 2D line represents a top layer of a 3D object, and wherein the 3D object is a 3D representation of the 2D object, with overhang, and wherein the top layer represents a ridge of a 3D roof that is disposed midway between two boundaries of a bottom layer of the 3D object;
determine the 3D roof of the 3D object based on the 2D line, the plurality of boundaries, a specified angle of the 3D roof, and a specified chamfer that connects two surfaces of the 3D roof, wherein the 3D roof comprises a plurality of layers, and wherein a layer of the plurality of layers is offset in an x and y direction of the 3D object within a supporting layer, wherein the supporting layer is in contact with the layer, and wherein the supporting layer supports the layer in a z direction of the 3D object, and wherein the specified angle of the 3D roof is less than 45 degrees with respect to the top layer and a boundary of a bottom layer of the 3D object;
generate a model of the 3D object for fabrication, wherein the model is generated based on the 3D roof and the 2D object.

17. The one or more computer-readable memory storage devices of claim 16, wherein the stored computer-readable instructions when executed by one or more processing devices are further configured to direct the one or more processing devices to determine a layer offset for the 3D object model of the 3D object based on a height of a third dimension of the 3D object and on an adjustment made for 2D polygons of a generated 2D triangular mesh.

18. The one or more computer-readable memory storage devices of claim 17, wherein the determined layer offset for the 3D object model of the 3D object results in an offset angle less than 45 degrees relative to a surface of the 3D object.

19. The one or more computer-readable memory storage devices of claim 16, wherein the stored computer-readable instructions when executed by one or more processing devices are further configured to direct the one or more processing devices to generate a 2D triangular mesh of a 2D image shape for the 3D object using a triangulation method based on sampled coordinates of a curve that substantially fits an edge of the 2D image shape.

20. The one or more computer-readable memory storage devices of claim 16, wherein the 3D model of a feature from a two-dimensional (2D) image comprises ridges formed by intersecting chamfers, each chamfer having angles less than 45 degrees relative to the 3D object.

* * * * *